June 22, 1937.  P. P-G. HALL  2,084,801
MACHINE TOOL SPINDLE AND ARBOR
Filed March 27, 1936

INVENTOR
Peter P-G. Hall.
BY *[signature]*
ATTORNEY

WITNESS
*[signature]*

Patented June 22, 1937

2,084,801

UNITED STATES PATENT OFFICE 2,084,801

MACHINE TOOL SPINDLE AND ARBOR

Peter P-G. Hall, Philadelphia, Pa., assignor to The Hall Planetary Company, Philadelphia, Pa., a corporation of Pennsylvania Application March 27, 1936, Serial No. 71,101

14 Claims. (Cl. 90—11)

This invention is particularly directed to a novel method of and improved means for accurately centering and securely but removably holding an arbor, tool shank or generally similar element in axial alignment and operative relation with the spindle of a milling machine, lathe or other machine tool.

It has heretofore been usual practice to provide in the end of a machine tool spindle a relatively long tapered bore for the reception of a correspondingly tapered portion of the element, be it an arbor, the shank of a tool, collet or the like, designed to be operatively but removably associated therewith, the coincidence of the tapered surfaces of the spindle and the element, hereinafter for convenience called the "arbor", being relied on to properly locate and center it in the spindle and to afford sufficient frictional engagement when the arbor is driven tightly home to cause it to turn with the spindle when the latter is rotated; to attain these results, however, the tapered surfaces in the spindle and on the arbor must be formed with extreme precision for otherwise the arbor will not center accurately in the spindle and will vibrate and chatter during operation with resulting inaccuracy in the work.

To enhance the wearing qualities of the parts the metal adjacent these surfaces should be hardened and, in practice, it is an extremely difficult matter to subsequently grind them so that when fitted together they will be precisely concentric with the axis of the spindle and coincident with each other throughout their lengths, and this is particularly true when, as is often the case, the machine spindle is made by one manufacturer and the arbors or tools to be used therein by another; additionally, the frequent removal of the arbor from the spindle and/or the use of different arbors in the same spindle eventually produces appreciable wear so that even if, when initially manufactured, the required accuracy and precision are present, these attributes are rapidly diminished in use and ultimately necessitate the renewal or regrinding of the parts to enable accurate work to be performed on the machine tool of which they are components. Moreover, the customary practice of driving the arbor into the spindle in order to secure the requisite frictional engagement between the tapered surfaces is extremely inimical to the bearings in which the spindle is supported particularly when they are of the antifriction type and in a comparatively short time results in disalignment of the spindle.

It is therefore a principal object of my invention to overcome these and other disadvantages inherent in the customary method of coupling arbors to machine tool spindles by the provision of a spindle and arbor of novel design whereby the arbor may be accurately centered in and securely but removably coupled to the spindle in accordance with a novel principle whereby the arbor is located in the spindle by effecting contact between the parts only in axially spaced relatively short zones instead of throughout continuous extended tapered surfaces.

Another object of the invention is the provision of an improved mechanism whereby an arbor may be mounted in a machine tool spindle and automatically and accurately centered and held firmly in position therein by locating it at axially spaced zones and applying radially directed pressure at one of them to prevent relative movement between the parts with consequent vibration and chattering.

A further object is the provision of mechanism of this character in which the necessity for providing accurately ground coincident tapered surfaces on the respective parts is obviated without impairment of capacity to properly center the arbor in the spindle or the rigidity with which the parts are held in assembled relation thereafter.

A still further object is to provide a machine tool spindle and arbor which may be coupled in or uncoupled from operative relation without the necessity of driving the arbor forcibly into or out of the spindle with consequent likelihood of damage to the bearings or other parts of the machine tool of which it forms a part.

An additional object is to provide a novel method of centering and holding an arbor in a machine tool spindle or the like.

Other objects, purposes and advantages of the invention will hereinafter more fully appear or be understood from the following description of certain embodiments thereof during which reference will be had to the accompanying drawing, in which Fig. 1 is a fragmentary longitudinal axial section of a machine tool spindle and arbor constructed in accordance with the invention and in operatively assembled relation.

Figure 1:
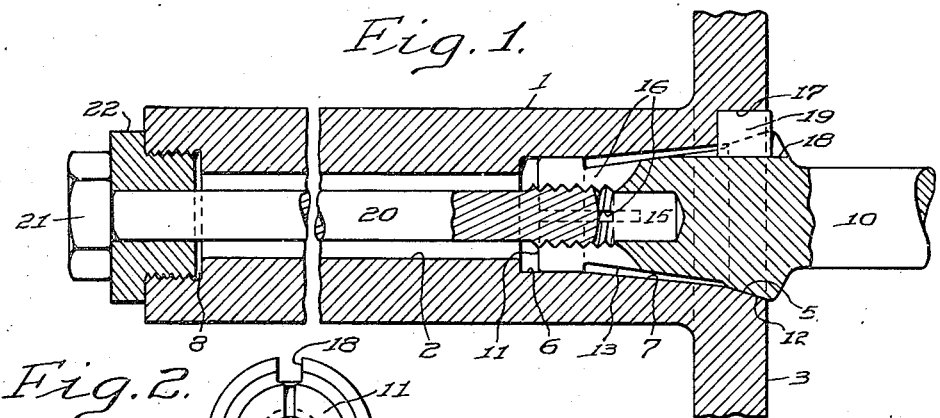
Figure 2:
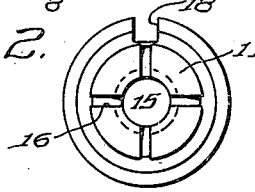
Fig. 2 is a rear end view of the arbor removed from the spindle.

Referring first to the form of the invention shown in Figs. 1 and 2, the spindle 1 which may be a component part of a milling machine, lathe or other machine tool, comprises a cylindrical body 1 having an axial main bore 2 and a flange 3 at its front end in accordance with the usual practice.

Bore 2 is enlarged toward the said end of the spindle and terminates in a relatively short, outwardly tapered annular zone 5, and in rear thereof but in spaced relation thereto is a cylindrical zone 6, both said zones being of course concentric with the spindle axis. The intervening space 7 between the inner end of the tapered zone and the cylindrical zone may be of any desired contour but is preferably generally inwardly tapered as shown, since the diameter of the cylindrical zone is desirably somewhat less than the least diameter of the tapered zone. At its opposite end the spindle may be provided with a threaded counterbore 8 somewhat larger than main bore 2.

The arbor 10 or other element designed for association with the spindle is provided adjacent its rear end with a cylindrical zone 11 adapted to form a good sliding fit in zone 6 so it can be readily entered thereinto or withdrawn therefrom by hand, and is also provided at a point remote from zone 11 with a relatively short peripheral tapered zone preferably generally corresponding to zone 5 on the spindle, while between the two said zones surface 13 of the arbor is so formed as to be entirely out of contact with the spindle when the parts are assembled as hereinafter described, both said zones being coaxial with the arbor and the distance between them approximating the distance between zones 5—12. An axial internally threaded bore 15 is extended inwardly from the rear end of the arbor, the threads being preferably so formed as to include an angle of at least 60° between their sides, for example and as illustrated, an angle approximating 90°, and to afford capacity for radial expansion longitudinal slots 16 are cut in the said end through zone 11 and for a suitable distance therebeyond, four of these slots set at intervals of 90° being shown although a larger or smaller number may of course be employed.

When the spindle and arbor are assembled in operative relation as in Fig. 1, the arbor is located in the spindle by engagement therewith at axially spaced points, namely, in the areas or zones 5—12 and 6—11, and while it is desirable, it is not essential for the tapered zones to coincide throughout their length since in reality all that is necessary to properly locate and center the arbor adjacent the front end of the spindle is a circular line contact between the parts concentric with the spindle axis and in a plane normal thereto. Thus from the standpoint of proper location of the arbor in the spindle, the length or area of the bearing between zones 5—12 is immaterial although it is preferable, especially if the arbor is to be frequently removed and replaced, that they coincide for a sufficient distance to afford a seat for it in the spindle of sufficient area to minimize wear which would occur more rapidly if the parts were in contact solely in a plane of inappreciable thickness. Save in this respect it will now be understood that coincidence of the said surfaces is unessential and consequently if they are formed on slightly different tapers due to inaccuracies in grinding or the like the capacity for accurate centering of the arbor in the spindle is unaffected.

As frictional engagement between the spindle and arbor is not primarily relied upon to insure rotation of the arbor with the spindle, any means suitable for positively driving one from the other are preferably provided, said means as shown comprising complementary keyways 17, 18 in the spindle and arbor and a key 19 inserted therein to lock the parts together, but where very light work is being performed it is sometimes feasible to rely solely on the frictional engagement between the parts to impart the necessary drive.

The rear end of the arbor is also positively located, centered and held in the spindle by the means now to be described, which in the embodiment of the invention shown in Fig. 1 comprise a draw bolt 20 extending axially through the spindle with its head 21 overlying a bushing 22 threaded into the counterbore 8, and provided at its opposite end with threads corresponding to those in bore 15 in the arbor whereby the draw bolt may be screwed into or unscrewed from the latter by turning its head with a wrench.

With the parts constructed essentially as just described, the arbor is assembled in the spindle by first pushing it manually thereinto until the threads on the draw bolt can be engaged with those in bore 15 after which further rotation of the bolt is operative to draw the arbor inwardly until tapered zones 5—12 are brought into engagement, the keyways being preferably aligned during this operation and key 19 inserted therein. During this movement of the arbor its front end is gradually brought into exact concentricity with the spindle as the locating surfaces 5—12 engage more and more snugly, and as the resistance to longitudinal movement increases due to such engagement further rotation of the draw bolt expands the rear end of the arbor due to the radial wedging action of the cooperative thread faces on the bolt and in the arbor until zone 11 is locked very tightly against zone 6 in the spindle, thus firmly and rigidly locating the rear end of the arbor therein, correcting any slight disalignment which may have been present prior to setting up the draw bolt and negativing any possibility of play or lost motion between the arbor and the spindle. The arbor is now firmly and accurately located at longitudinally spaced points and rigidly held in accurate concentricity with the spindle, but of course can be readily released preparatory to removal by unscrewing the draw bolt, thereby permitting the segments of the cylindrical zone 11 to release their clamping engagement with the spindle and resume their normal position. There is consequently no necessity for driving the arbor into or out of place in the spindle at any time in the operations of coupling it thereto or uncoupling it therefrom, nor at any time is there any severe wedging action between the tapered zones 5—12.

Figure 3:
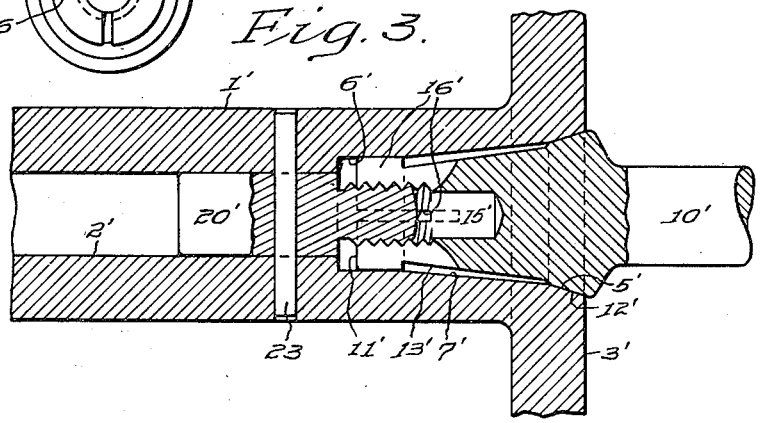
Figs. 3 and 4 are views generally similar to Fig. 1 respectively showing slightly modified forms of the invention, the parts in these figures generally corresponding to those in the preceding ones being designated by similar numerals with the addition of superscriptions.

In the form of the invention hitherto described, the draw bolt 20 is extended beyond the rear end of the spindle for suitable manipulation at that point when removing and replacing the arbor, a construction which is usually convenient when the spindle is located in a horizontal position, but when the machine tool of which it forms a component part is so arranged that the spindle extends vertically or the rear end thereof is otherwise rendered more or less inaccessible, it may be deemed preferable to employ the construction shown in Fig. 3 to which reference will now be had. In this embodiment of the invention the several parts are formed substantially as in the embodiment shown in Fig. 1 save that keyways 17, 18 and key 19 are ordinarily omitted, and draw bolt 20' instead of being extended to the other end of the spindle has a short shank fitting snugly in the front end of bore 2' and permanently secured in place therein in any convenient way, as for example, by a pin 23 extended through the spindle and the shank. In the operation of coupling the arbor to the spindle, the former is first entered in the latter and the threads in bore 15' engaged with those on the draw bolt, after which the parts are turned relatively to each other so as to draw the arbor into the spindle, initially engage tapered zones 5', 12' and ultimately expand the rear end of the arbor against the wall of cylindrical bore 6' to thereby center and hold it therein in the manner hitherto described.

Of course in the absence of key 19 or other means for imparting a positive drive to the arbor from the spindle, it is essential that during the operation of the machine the resistance encountered by the arbor or tool be in a direction such that it tends to screw the arbor further onto the draw bolt 20' for if exerted in the other direction it will obviously tend to back the arbor out of the spindle.

Figure 4:
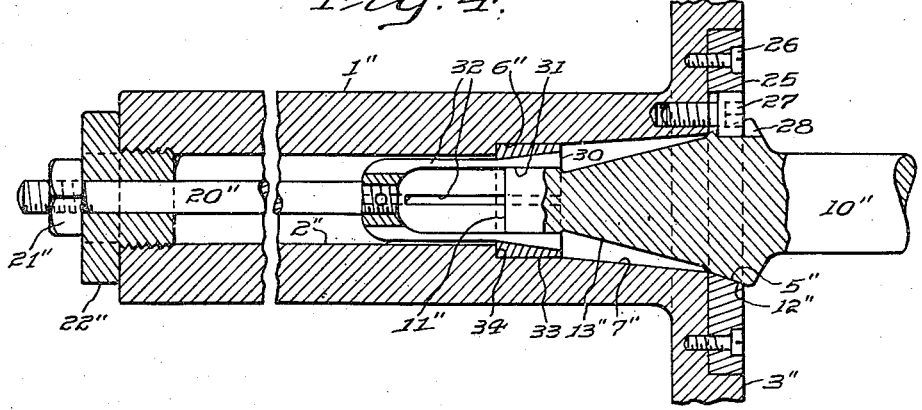

Another embodiment of the invention is illustrated in Fig. 4 and includes certain features which may sometimes be advantageously incorporated in those hereinbefore described.

Thus, instead of forming tapered zone 5" directly in the spindle, it is formed in a hardened plate 25 removably seated in a counterbore in the face of spindle flange 4" and held in position by screws 26 located at spaced intervals around the plate. This construction obviates the necessity for hardening the spindle and grinding the tapered zone directly therein while in case of wear a new plate can be quickly substituted in lieu of the worn one, and it will of course be understood that a generally similar removable plate may be utilized if desired in either of the forms of the invention shown in the preceding figures. Further, instead of employing a key to insure a positive drive being imparted to arbor 10", one or more cap screws 27 may be utilized and although only one of these screws is shown, a plurality thereof uniformly spaced about the arbor are preferably employed. For reception of the heads of these screws, recesses 28 are formed in the peripheral surface of the arbor adjacent its tapered zone 5", the inner ends of these recesses providing abutments against which the heads of the screws bottom when they are set up tight, and the screws thus not only insure positive rotation of the arbor in each direction but assist to some extent in holding it properly seated against the tapered surface 12" in the plate or spindle as the case may be. Instead of this construction, however, a key or other suitable means to insure the requisite drive may be utilized as in Fig. 1 or said construction may be employed therein in lieu of the key.

As in the forms of the invention previously described the arbor is provided with a tapered zone 5" for cooperation with zone 12" in the plate and at its rear end with a cylindrical zone 11" desirably of relatively smaller diameter than the corresponding zones of the arbors shown in the preceding figures and also devoid of the slots. This cylindrical zone 11", moreover, does not directly engage the wall of cylindrical zone 6" when the arbor is assembled in the spindle but is received in the end of a draw collet 30 having a bore 31 in which the end of the arbor forms a good sliding fit when the collet is in normal or uncontracted position. To enable the collet to contract it is provided with longitudinal circumferentially spaced slots 32 and its outer surface is tapered inwardly and rearwardly from its front end and received in a correspondingly tapered and hardened bushing 33 seated in zone 6" in the spindle. This zone is of greater diameter than bore 2" extending through the spindle so that a shoulder 34 is formed at the rear end of the zone against which bushing 33 abuts so that it is held against longitudinal displacement toward the rear of the spindle when the collet is drawn in that direction by the mechanism now to be described which comprises a draw bolt 20" threaded and pinned at its front end in the rear end of the collet and extending rearwardly in bore 2" beyond the rear end of the spindle where it is threaded and provided with a nut 21", a bushing 22" threaded into the end of the spindle forming a bearing for the bolt adjacent thereto.

Preparatory to assembling the arbor in the spindle, nut 21" is backed off and the draw bolt pushed forward to allow the collet to assume its normal or expanded position. Arbor 10" is then inserted into the spindle and pushed home until its tapered zone 5" engages or substantially engages tapered zone 12" in the spindle end. Screws 27 may then be inserted and set up relatively tightly and nut 21" then rotated in a direction to pull draw bolt 20" rearwardly, thus drawing the tapered portion of the collet into bushing 33 and causing it to contract about cylindrical zone 11" on the arbor, thereby locating the rear end of the arbor concentric with the spindle and securely clamping it in that position while at the same time urging the arbor as a whole rearwardly through the drawing action exerted by the collet so as to insure the proper location of the front end of the arbor in the manner hitherto described. When the arbor is to be removed from the spindle, nut 27" is backed off to permit forward movement of the draw bolt and collet to release the cylindrical zone of the arbor following which, after removal of cap screws 27, the arbor may be manually withdrawn.

It will of course be understood that the mechanism just described for clamping and locating the rear end of the arbor may be utilized in the form of the invention shown in Fig. 1 in lieu of the draw bolt therein shown and that in any form of the invention instead of arranging for direct contact between the cylindrical zone of the arbor and the wall of the bore in the spindle, a hardened and ground bushing generally similar to bushing 33 but of course having a cylindrical instead of tapered inner surface may be seated in the cylindrical zone 6 of the spindle to provide a removable element which can be readily replaced in case of wear.

It will now be apparent that in order to insure the proper location and centering of the arbor in the spindle it is only requisite that zones 6—12 be formed concentric with the axis of the spindle and zones 5—11 likewise concentric with the axis of the arbor since coincidence between the respective tapered zones throughout their lengths, though desirable, is not essential, and that, moreover, the cylindrical zone on the arbor may form a free working fit in the corresponding zone in the spindle to enable its insertion and withdrawal from the spindle without the application of any considerable amount of force yet without occurrence of any looseness or chattering between the parts when fully assembled because of the severe radial pressure exerted between the said zones. Since in the manufacture of the parts it is a comparatively easy matter to form the several zones in accordance with these conditions, my invention therefore marks a distinct advance in the art as it enables the production of spindles and arbors adapted for accurate operative assembly at a relatively low cost and avoids the difficulties heretofore encountered in the manufacture and use of spindles and arbors of customary construction.

While I have herein described certain embodiments of my invention with considerable particularity, I do not thereby desire or intend to in any way restrict or confine myself thereto as numerous changes and modifications other than those to which I have particularly referred may be made in the form, construction and arrangement of the parts to better adapt them for various conditions encountered in practice or for other reasons without departing from the spirit and scope of the invention as defined in the appended claims.

Having thus described my invention, I claim and desire to protect by Letters Patent of the United States:

1. A machine tool spindle having an axial bore terminating at one end in an outwardly tapered annular zone and providing a cylindrical zone axially spaced therefrom, and, in combination therewith, an arbor extending into said bore having a tapered zone engaging said tapered zone and a cylindrical zone spaced therefrom and aligned with the cylindrical zone in the spindle, and means operating to cause exertion of radial pressure between said cylindrical zones to thereby rigidly clamp the arbor in the spindle.

2. In combination with a hollow spindle having a bore enlarged adjacent one end, an arbor extending into the bore having a cylindrical zone adjacent its inner end and a tapered peripheral zone axially spaced therefrom engaging the wall of the spindle bore adjacent its outer end, and means operating to cause exertion of radial pressure between the cylindrical zone of the arbor and the surrounding wall of the bore to thereby rigidly clamp the arbor in the spindle.

3. A machine tool spindle having an axial bore terminating at one end in an annular outwardly tapered zone and, in combination therewith, an arbor extending into the bore having a peripheral tapered zone substantially coincident with the aforesaid zone and a cylindrical zone adjacent its rear end, and means operative to radially expand said end of the arbor to bring said cylindrical zone into snug engagement with the surrounding wall of the spindle bore.

4. A machine tool spindle having an axial bore outwardly tapered adjacent the end of the spindle and providing a cylindrical zone inwardly spaced from said end and said tapered zone and, in combination therewith, an arbor extending into the bore having a cylindrical rear end portion adapted for radial expansion, and a draw bolt extending in the bore of the spindle and threaded into the rear end of the arbor whereby relative rotation of the bolt and arbor is operative to draw the arbor rearwardly into the spindle bore until it seats in the tapered end thereof and to then expand its rear end to bring its surface into severe engagement with said cylindrical zone and thereby clamp the arbor in the spindle with its axis in coincidence with the axis of the spindle.

5. In combination with a machine tool spindle having an axial bore terminating at one end of the spindle in an outwardly tapered relatively narrow annular zone and providing a cylindrical zone within the spindle in axially spaced relation thereto, an arbor extending into the spindle having a tapered peripheral zone substantially coinciding with the tapered zone in the spindle and a cylindrical inner end portion aligned with said cylindrical zone, slotted longitudinally and having an axial internally threaded bore, and a draw bolt extending in the spindle bore and threaded into the bore in the arbor adapted to radially expand the same through coaction of its threads with those in the arbor and thereby bring said cylindrical zones into intimate engagement to rigidly hold the arbor in coaxial relation with the spindle.

6. In combination with a machine tool spindle having an axial bore enlarged adjacent one end of the spindle, an arbor adapted to seat in the enlarged end of the bore and having a cylindrical zone at its rear end, a contractible draw collet embracing said cylindrical end and having an outer tapered surface, a bushing seated in the spindle bore about said surface, and means operable to move the collet relatively to the bushing to thereby draw the arbor axially toward the end of the spindle and exert radial clamping pressure between the spindle and the arbor.

7. In combination with a machine tool spindle having a bore terminating at one end in an outwardly tapered peripheral zone, an arbor having a tapered peripheral zone engageable with the aforesaid zone and a cylindrical rear end portion spaced therefrom, a bushing having a tapered inner surface surrounding said cylindrical portion, a contractible draw collet interposed between the bushing and the arbor having an outer tapered surface cooperative with the bushing, and means for moving the collet in the spindle in a direction to cause it to contract about the arbor to thereby draw the tapered zone of the latter into engagement with the corresponding zone in the spindle and exert radially directed clamping pressure on the cylindrical part of the arbor to clamp it in the spindle in coaxial relation therewith.

8. In combination, a machine tool spindle having an axial bore terminating at one end in an outwardly tapered relatively short annular zone and providing a cylindrical zone within the spindle in axially spaced relation thereto, an arbor having a relatively short tapered peripheral zone, a cylindrical, radially expandible inner end portion axially spaced therefrom and an axial internally threaded bore, and a draw bolt extending in the spindle bore threaded into the bore in the arbor adapted, on relative rotation of the bolt and arbor, to draw the latter inwardly into the spindle to engage its tapered zone with that of the spindle and then through coaction of its threads with those in the arbor to expand the inner end of the latter tightly against said cylindrical zone.

9. An arbor adapted for operative assembly in a machine tool spindle and comprising a cylindrical radially expandible rear end portion having an axially internally threaded bore and a relatively short peripheral zone spaced from said portion and tapering inwardly in the direction thereof.

10. A machine tool spindle having an axial bore terminating at one end in an annular outwardly tapered zone and, in combination therewith, an arbor extending into the bore having a peripheral tapered zone substantially coincident with the aforesaid zone and, axially spaced therefrom, a cylindrical zone adjacent its rear end, and means operable to draw the arbor axially against said tapered zone in the spindle and expand the rear end of the arbor in the spindle bore to thereby center and firmly clamp it therein.

11. In combination with a hollow spindle having a bore enlarged adjacent one end, an arbor extending into the bore having axially-spaced-apart coaxial zones, one of which is tapered and of least diameter adjacent the other, said tapered zone engaging the wall of the spindle bore adjacent its outer end, and means operating to cause the exertion of radial pressure between the other zone of the arbor and the surrounding portion of the spindle to thereby rigidly clamp the arbor in the latter.

12. In combination with a hollow spindle having axially spaced internal surfaces coaxial with the spindle, an arbor extending into the spindle having a tapered peripheral zone engaging one of said surfaces and another zone axially spaced therefrom in substantial correspondence with the spacing of said surfaces, and means operating to cause exertion of radial pressure between said other zone and the spindle in the vicinity of the other of said internal surfaces.

13. In combination, a machine tool spindle having an axial bore terminating at one end in an outwardly tapered relatively short annular zone, an arbor having a surface adapted to engage said zone to center the arbor in the spindle and another surface axially spaced therefrom, and means operating to cause exertion of radial pressure between the spindle and said other surface to hold the arbor in centered relation to the spindle.

14. An arbor adapted for operative assembly in a machine tool spindle and comprising a cylindrical radially expandible rear end portion and a relatively short peripheral zone spaced from said portion and tapering inwardly in the direction thereof.

PETER P-G. HALL.